United States Patent
Kurosawa et al.

(10) Patent No.: US 6,849,973 B2
(45) Date of Patent: Feb. 1, 2005

(54) STEPPING MOTOR

(75) Inventors: Souichi Kurosawa, Miyota-Machi (JP); Katsuyuki Moritsugi, Miyota-Machi (JP)

(73) Assignee: Minebea Company, Miyota-Machi (JP)

(*) Notice: Subject to any disclaimer, the term of this patent is extended or adjusted under 35 U.S.C. 154(b) by 13 days.

(21) Appl. No.: 10/456,692

(22) Filed: Jun. 5, 2003

(65) Prior Publication Data

US 2004/0051404 A1 Mar. 18, 2004

(30) Foreign Application Priority Data

Jun. 5, 2002 (JP) .......................... 2002-164152

(51) Int. Cl.$^7$ .............................................. H02K 11/00
(52) U.S. Cl. ...................... 310/49 R; 310/68 B; 310/89
(58) Field of Search ............................ 310/49 R, 68 B, 310/89, 254, 259, 261

(56) References Cited

U.S. PATENT DOCUMENTS

| | | | |
|---|---|---|---|
| 3,809,990 A | 5/1974 | Kuo et al. | |
| 4,127,802 A | * 11/1978 | Johnson | 318/696 |
| 4,638,195 A | * 1/1987 | Lin | 310/49 R |
| 4,642,496 A | 2/1987 | Kerviel et al. | |
| 4,772,815 A | 9/1988 | Harned et al. | 310/156 |
| 4,910,475 A | * 3/1990 | Lin | 310/49 R |
| 4,970,423 A | * 11/1990 | Tamae et al. | 310/162 |
| 5,239,218 A | 8/1993 | Hashimoto et al. | |
| 5,248,938 A | 9/1993 | Kobayashi et al. | |
| 5,369,322 A | 11/1994 | Maruyama et al. | |
| 6,124,654 A | 9/2000 | Siraky | |
| 6,225,715 B1 | 5/2001 | Hoda et al. | |
| 6,552,453 B2 | 4/2003 | Ohiwa et al. | |
| 2002/0047348 A1 | 4/2002 | Ohiwa et al. | 310/68 |

FOREIGN PATENT DOCUMENTS

| | | |
|---|---|---|
| EP | 1 369 978 A2 | 12/2003 |
| FR | 2 556 897 | 11/2003 |
| JP | 2001-025212 | 1/2001 |

OTHER PUBLICATIONS

Communication/European Search Report—Application No. 03253405.9–2207.

* cited by examiner

Primary Examiner—Thanh Lam
(74) Attorney, Agent, or Firm—Schulte Roth & Zabel LLP; Joel E. Lutzker; Mayankkumar Dixit

(57) ABSTRACT

A stepping motor has a cylindrical case that houses a motor stator and a sensor stator. The motor stator and the sensor stator are located at the opposing ends of the case. A motor rotor and a sensor rotor are mounted on a shaft and face the motor stator and the sensor stator, respectively. The sensor rotor and the sensor stator together form a rotational position sensor. The incorporation of the rotational position sensor in the case reduces demand for installation space. The gap of approximately 40 to 50 microns between a motor stator core and motor rotor cores is achieved by accurately locating the motor stator and the motor rotor. The case is sealed by the front flange and the rear cover, thereby, unfailingly preventing the invasion of contaminating foreign matter such as dust particles, oil, moisture etc.

14 Claims, 1 Drawing Sheet

STEPPING MOTOR

CROSS-REFERENCE TO RELATED APPLICATIONS

This application claims priority from the commonly-assigned Japanese Patent Application Number 2002-164152, filed on Jun. 5, 2002 and entitled "STEPPING MOTOR." Japanese Application No. 2002-164152 is incorporated by reference herein in its entirety.

BACKGROUND OF THE INVENTION

1. Field of the Invention

The present invention relates to motors, more particularly to a compact stepping motor with a rotational position sensor.

2. Description of the Prior Art

A conventional stepping motor rotates at a constant angle corresponding to an input from a driver. A conventional motor can be controlled with high rotational position control without using a rotational position sensor such as a resolver. However, when a stepping motor is used in a vehicle application such as control of coolant, air intake and exhaust for an engine, it is necessary for the stepping motor to be accurate. Additionally, the stepping motor must also unfailingly prevent loss of control, for example, due to loss of synchronism in severe environment such as vibration during driving. Thus, in a conventional stepping motor, when used in a vehicle application, it is common to provide a rotational position sensor such as a resolver or the like, to monitor the actual rotational position of the shaft and to provide feedback to achieve accurate rotational position.

There is a need to lower the emissions and attain greater fuel economy in automobiles. As a result, automotive equipments such as engine control devices are becoming increasingly complex and sophisticated, and constraints on vehicle installation space are also increasing. Therefore, there is a need for a compact stepping motor that does not require a separate rotational position sensor and thereby reduces the demand for space. There is also a need for a low-cost, easy-to-assemble stepping motor that can withstand the severe environment such as high temperature, low temperature, dust, moisture and oil that is found in a vehicle application.

SUMMARY OF THE INVENTION

A stepping motor illustrated in FIG. 1 overcomes the shortcomings of prior art and provides an accurate and compact stepping motor with integrated rotational position sensor. The stepping motor has a cylindrical case that houses a motor stator and a sensor stator. The motor stator and the sensor stator are located at the opposing ends of the case. A motor rotor and a sensor rotor are mounted on a shaft and face the motor stator and the sensor stator, respectively. The sensor rotor and the sensor stator together form a rotational position sensor. The incorporation of the rotational position sensor in the case reduces demand for installation space in a vehicle application. A gap of approximately 40 to 50 microns between a motor stator core and motor rotor cores is achieved by accurately locating the motor stator and the motor rotor. The opposing ends of case have claw parts spaced along the circumference. The claw parts are used to attach the front flange and the rear cover to the opposing ends of case. A connector is mounted on a sidepiece of the case. The attachment of the connector to the case, and sealing the case by the front flange and the rear cover unfailingly prevents the invasion of contaminating foreign matter such as dust particles, oil, moisture etc.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figure of the accompanying drawing in which like references denote like or corresponding parts, and in which.

DETAILED DESCRIPTION

Figure 1:
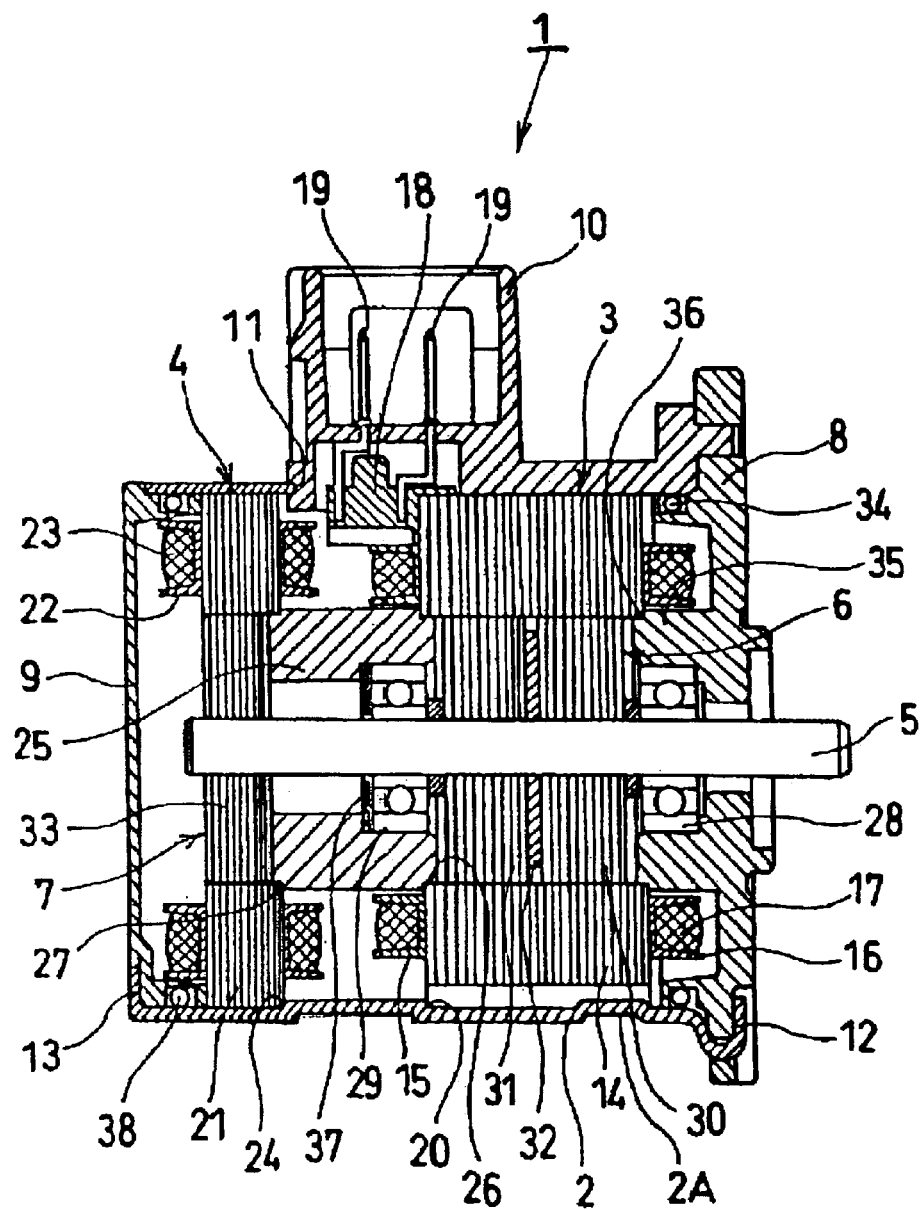
FIG. 1 shows a cross-sectional view of a stepping motor.

FIG. 1 shows a stepping motor 1 having a cylindrical case 2. The cylindrical case 2 houses a motor stator 3 and a sensor stator 4 (resolver stator). The motor stator 3 and the sensor stator 4 are located at the opposing ends of the case 2. A motor rotor 6 and a sensor rotor 7 (resolver rotor) are mounted on a shaft 5 and face the motor stator 3 and the sensor stator 4, respectively. A front flange 8 and a rear flange 9 are attached to the opposing ends of the case 2, thereby sealing case 2 against ingress of contaminants. A bearing 28 is inserted into the front flange 8. One end of the shaft 5, which is supported in the bearing 28, projects outside of the sealed structure. A notch 11 is formed in a sidepiece of case 2 and a connector 10 is mounted on the sidepiece by engaging with the notch 11. The opposing ends of case 2 have claw parts 12 and 13 spaced along the circumference. The claw parts 12 and 13 are used to attach the front flange 8 and the rear cover 9 respectively.

The motor stator 3 contains a stator core 14. The stator core 14 is formed by laminating thin sheets of a magnetic material. A specified number of magnetic poles are formed in the radial direction within the inner perimeter of stator core 14. At the tip of each magnetic pole, a specified number of micro-teeth of a specified pitch are formed in the circumferential direction. Coil bobbins 15 and 16 are placed around each of the magnetic poles in the stator core 14. The coil bobbins 15 and 16 are made of insulating material such as a synthetic resin. A coil 17 is wound through the coil bobbins 15 and 16 around each of the magnetic poles. Each phase of the coil 17 is connected to a connector pin 19. One end of the connector pin 19 is located in the connector 10, while the other end is located in a projection 18 of one coil bobbin 15.

A stage 20 is formed on the inner perimeter of the case 2. A protrusion 2A is formed near the stage 20. The motor stator 3 is of such shape that when assembled in the case 2, the motor stator 3 is fixed in its place by the combined action of the stage 20 and the protrusion 2A.

The sensor stator 4 has a laminate-structured sensor stator core 21. The stator core 21 has a magnetic pole and micro-teeth similar to the motor stator 3. A coil 23 is wound around the sensor stator magnetic pole via a bobbin 22. The sensor stator 4 is located at the end of case 2 that is away from the motor stator 3. A stage 24 is formed on the inner perimeter of case 2. The sensor stator 4 is fixed in its place by contacting the stage 24. The coil 23 is connected to an external circuit via, for example, a connector, a terminal or a cable [not shown in FIG. 1] that penetrates the sidepiece or the rear cover 9 of the case 2. Alternatively, a connector pin may be added to the connector 10 for connecting to the coil 23.

A cylindrical bushing 25 (internal spigot member) is inserted between the stator core 14 and the stator core 21. Stages 26 and 27 are formed at opposing ends of the bushing 25. The stator cores 14 and 21 contact stages 26 and 27 respectively, thereby fixing the relative position of stator cores 14 and 21 in axial direction and also fixing the radial positions of stator cores 14 and 21. A bearing 29 is inserted in one end of the cylindrical bushing 25. A spring shim 37 is placed between the bearing 29 and the bushing 25.

The motor rotor 6 consists of rotor cores 30 and 31. The rotor cores 30 and 31 are made from laminated magnetic material. A ring-shaped magnet 32 is placed between the rotor cores 30 and 31. The motor rotor 6 is fixed in place by pressing it on the shaft 5. The shaft 5 is supported in the bearings 28 and 29. Micro-teeth are formed on the outer periphery of the rotor cores 30 and 31. The micro-teeth on rotor cores 30 and 31 are mutually staggered by a half pitch. The micro-teeth on rotor cores 30 and 31 and the micro-teeth on magnetic poles of the motor stator 3 have same pitch and face each other. The gap between the stator core 14 and motor cores 30 and 31 is approximately 40 to 50 microns.

The sensor rotor 7 consists of a rotor core 33 made of magnetic material. The rotor core 33 is fixed in place by pressing it on the shaft 5. The gap between the stator core 21 and the rotor core 33 is approximately 100 to 150 microns.

The front flange 8 is fixed to one end of the case 2 by crimping the claw parts 12. The gap between case 2 and front flange 8 is sealed, for example, by an o-ring 34. Other means may be used to seal the gap between case 2 and front flange 8. A cylindrical support part 35 (internal spigot part) is located substantially centrally on the front flange 8. The support part 35 projects inside the stepping motor. The ball bearing 28 fits inside the support part 35. The ball bearings 28 and 29 are preloaded by the spring shim 37. A stage 36 is formed at the tip of the outer periphery of support part 35. One end and the inner periphery of stator core 14 contacts the stage 36, thereby fixing the axial and radial position of motor stator 3.

The rear cover 9 is fitted to the other edge of the case 2 by crimping the claws 13. The gap between case 2 and rear cover 9 is sealed, for example, by an o-ring. Other means may be used to seal the gap between case 2 and rear cover 9. An edge of the rear cover 9 contacts the stator core 21, thereby fixing the position of sensor stator 4 in the case 2.

The connector 10 is waterproof. The connector 10 fits in the notch 11 and also engages the front flange 8. The seal between the connector 10 and the case 2 is airtight.

The gap between the front flange 8 and the shaft 5 can be sealed by a device (not shown in FIG. 1) that is mounted on the shaft 5 and is driven by stepping motor 1. Alternatively, the gap between front flange 8 and shaft 5 may be sealed, for example, by an o-ring.

In use, a wiring-side connector (not sown in FIG. 1) is connected to the connector 10, and energizes the coil 17 of the motor stator 3 via the connector pin 19. This, in turn, magnetizes the magnetic pole of motor stator 3. When the magnetic phases are switched sequentially, the motor rotor 6 rotates in steps equal to half the pitch of the micro-teeth. The rotation of motor rotor 6 causes rotation of stator rotor 7, which, in turn, causes voltage variations in the coil 23 of the sensor stator 4. By detecting this voltage variation by means of an external detection circuit (not shown in FIG. 1), it is possible to detect the rotational position of the shaft 5. Thus, it is possible to monitor the actual rotational position of the shaft 5 and apply appropriate feedback for accurate positioning of the shaft 5.

The incorporation of a rotational position sensor in the case 2 reduces demand for installation space in a vehicle application. The attachment of connector 10 to the case 2, and sealing the case 2 by the front flange 8 and the rear cover 9 unfailingly prevents the invasion of contaminating foreign matter such as dust particles, oil, moisture etc.

The inner periphery of stator core 14 touches the stage 26 and 36 of the cylindrical bushing 25 and the support part 35 respectively, and the bearings 29 and 28 are mounted in the cylindrical bushing 25 and the support part 35 respectively. Thus, it is possible to increase the concentricity of the bearings 29 and 28 and, as a result, substantially reduce the gap between the motor stator 3 and motor rotor 6, thereby reducing the size and increasing the torque of the stepping motor 1.

The inner periphery of sensor stator core 21 contacts stage 27 on the cylindrical bushing 25. Also, the sensor rotor 7 is mounted on the shaft 5, which, in turn, is supported in bearing 29. Thus, it is possible to increase the concentricity of the sensor stator 4 and sensor rotor 7, thereby increasing the detection accuracy.

The stepping motor 1 can be easily assembled as follows: The connector 10 is attached to the motor stator 3, thereby connecting the winding wire of coil 17 and the connector pin 19. Then, the connector 10 is matched with the notch 11 of the case 2. The front flange 8 that has in it the ball bearing 28 is attached to one end of the case 2 and is fixed in place by crimping the claws 12. The shaft 5, to which the motor rotor 6 is attached, is inserted into the motor stator 3 from the other end of case 2. The bushing 25 that has in it the spring shim 37 and the ball bearing 29 is inserted from the other end of the case 2, and is positioned to contact the stator core 14 of the motor stator 3. The sensor stator 4 is inserted from the open end of case 2, and the stator core 21 is made to contact the bushing 25. The winding wire of the coil 23 of the sensor stator 4 is appropriately connected to the appropriate terminal (not shown in FIG. 1). The sensor rotor 7 is pressed into the shaft 5. The rear cover 9 is fitted to the other end of case 2, and is fixed in place by crimping the claws 13. Since the interior of case 2 is easily accessible from both ends, there is a high degree of freedom of assembly that results in superior assembly capability.

The embodiments described above are exemplary only. For example, an encoder or an electromagnetic rotational sensor may be used in place of the resolver. For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A stepping motor comprising:
   a case having a first end and a second end;
   a motor stator located at the first end of the case;
   a motor rotor facing the motor stator;
   a stage formed in the case;
   a protrusion formed in the case, the protrusion and the stage together accurately locating the motor stator with respect to the motor rotor;

a sensor stator located at the second end of the case;

a sensor rotor facing the sensor stator;

a shaft rotatably mounted in the case, the shaft having the motor rotor and sensor rotor mounted on it;

a first cover mounted on the first end; and a second cover mounted on the second end.

2. The stepping motor of claim 1, further comprising:

a first spigot, the first spigot being integral with the first cover;

a second spigot located between the motor stator and the sensor stator;

a first bearing mounted in the first spigot; and a second bearing mounted in the second spigot; wherein the shaft is supported in the first bearing and the second bearing, and wherein the internal perimeter of the motor stator contacts the first spigot and the second spigot, and the internal perimeter of the sensor stator contacts the second spigot.

3. The stepping motor of claim 1, further comprising:

a connector mounted on a side of the case, the connector being connected to at lest one of the motor stator and the sensor stator.

4. The stepping motor of claim 1, wherein the gap between the motor stator and the motor rotor is in the range of 40 to 50 microns.

5. The stepping motor of claim 1, wherein the gap between the sensor stator and the sensor rotor is in the range of 100 to 150 microns.

6. The stepping motor of claim 1, further comprising:

a first seal formed between the first cover and the case; and a second seal formed between the second cover and the case.

7. The stepping motor of claim 6 wherein the first seal and the second seal are formed by o-rings.

8. A stepping motor comprising:

a case having a first end and a second end;

a motor stator located at the first end of the case;

a sensor stator located at the second end of the case;

a motor rotor facing the motor stator;

a sensor rotor facing the sensor stator;

a shaft rotatably mounted in the case, the shaft having the motor rotor and sensor rotor mounted on it;

a first cover mounted on the first end; and a second cover mounted on the second end.

9. The stepping motor of claim 8, further comprising:

a first spigot, the first spigot being integral with the first cover;

a second spigot located between the motor stator and the sensor stator;

a first bearing mounted in the first spigot; and a second bearing mounted in the second spigot; wherein the shaft is supported in the first bearing and the second bearing, and wherein the internal perimeter of the motor stator contacts the first spigot and the second spigot, and the internal perimeter of the sensor stator contacts the second spigot.

10. The stepping motor of claim 8, further comprising:

a connector mounted on a side of the case, the connector being connected to at lest one of the motor stator and the sensor stator.

11. The stepping motor of claim 8, wherein the gap between the motor stator and the motor rotor is in the range of 40 to 50 microns.

12. The stepping motor of claim 8, wherein the gap between the sensor stator and the sensor rotor is in the range of 100 to 150 microns.

13. The stepping motor of claim 8, further comprising:

a first seal formed between the first cover and the case; and a second seal formed between the second cover and the case.

14. The stepping motor of claim 13 wherein the first seal and the second seal are formed by o-rings.

* * * * *